Aug. 11, 1959  G. R. MORTON  2,899,112

DISPOSABLE GREASE CONTAINER

Filed Sept. 16, 1955

INVENTOR.
Glen R. Morton
BY A. Hiram Sturges
Agent

United States Patent Office 2,899,112
Patented Aug. 11, 1959

2,899,112

DISPOSABLE GREASE CONTAINER

Glen R. Morton, Omaha, Nebr.

Application September 16, 1955, Serial No. 534,709

2 Claims. (Cl. 222—325)

This invention relates to lubricating pumps commonly called grease guns, and it is an object of this invention to provide a disposable grease container for use with such grease guns.

A particular object of this invention is to provide a grease container especially adapted to be inserted into a grease gun whereby it is unnecessary to remove the grease from the container to load the gun, thus avoiding a time-consuming step in the use of grease guns.

Another particular object of this invention is to provide a disposable grease container having a rearward end closure member which functions as a grease follower at times when the grease is being drawn from the forward end of the grease container and as a result of atmospheric pressure against the outer side of the closure member, which latter is greater than the pressure against the inner side of the closure member at times when grease is being sucked from the forward end of the container.

A further object of the invention is to provide a combination grease gun and disposable grease container assembly which is particularly adapted for the firm holding and support of the grease container.

A still further object is to provide the grease gun and disposable grease container assembly which is preferably provided with a protecting sleeve of stiff material for protecting the disposable grease container from accidental damage whereby the grease container can be made of inexpensive and relatively weak material.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

Figure 1:
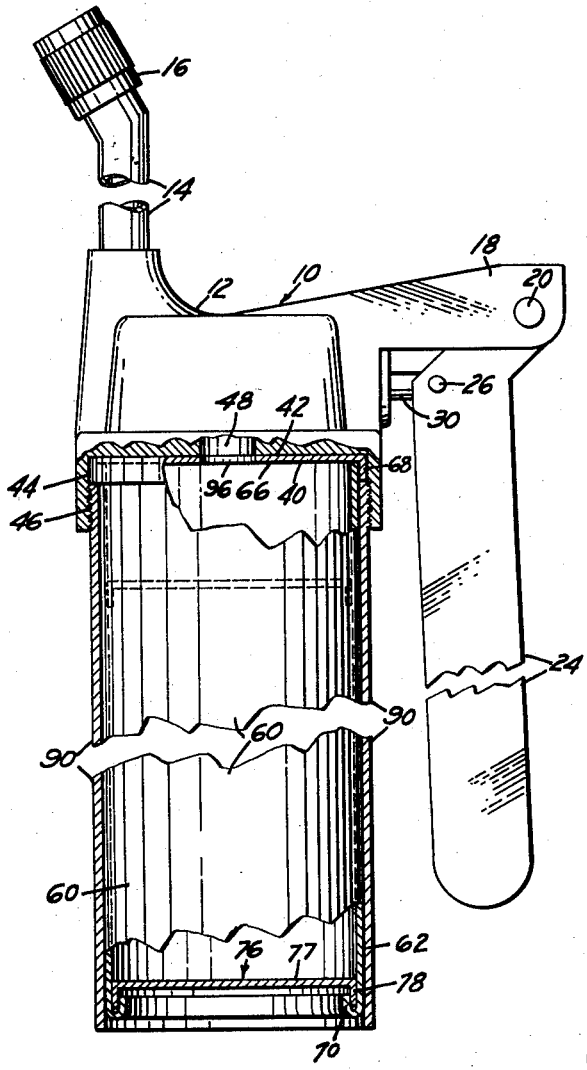
Figure 1 is a side elevation of a grease pump shown with the disposable grease container of this invention attached thereto, the grease container and certain parts of the pump being shown with parts broken away and other parts showing a cross-section for convenience of illustration.

The disposable grease container and lubricating pump or grease gun assembly of this invention preferably utilizes the grease gun shown at 10 in Figure 1.

The grease gun 10 has a pumping head section 12 having an elongated outlet pipe 14 provided with a fitting 16 at its forward end of any suitable type for application to greasing fittings on machinery.

The grease gun 10 preferably has one or more members 18 extending outwardly from one side thereof for receiving a pivot pin 20 therethrough which latter connects the member 18 pivotally to a forward end of a handle 24.

The handle 24 is connected by a further pivot pin 26 to a connecting link-rod 30 which extends slidably through the side portion of the pumping head 12 of the grease gun 10.

The pumping head section of the pump has a recess 40 therein which latter has an inner wall 42 which is preferably flat. The recess 40 has a cylindrical side wall 44 which is threaded at 46 on its rearward end for purposes later described.

The pumping head section 12 also has an aperture 48 extending inwardly from the center of the inner wall 42 of the recess 40. The aperture 48 extends forwardly to a pumping chamber, not shown, whereby grease can flow through the aperture 48 and into the chamber to be later pumped out through the outlet pipe 14.

A disposable grease container of this invention is shown at 60 and has an annular side wall portion 62 which is preferably of cylindrical shape, the interior of the container 60 being hollow for receiving grease.

The side wall portion 62 has open forward and rearward ends. The forward end of the side wall 62 is closed by a forward cap member of portion 66. The cap portion 66 is disposed transversely to the side walls 62 of the container 60 and the cap portion 66 further has an attached annular flange 68 which is disposed in a position extending rearwardly over the outer side of the forward end of the annular side wall portion 62 of the grease container. The cap flange 68 is of a size and shape complemental to the shape of the annular side wall portion 62 and fits snugly against the outer side of the side wall portions 62, being secured thereto by suitable means, not shown.

The side wall portion 62 of the container 60 is preferably of a construction having all inner side surfaces parallel to an imaginary straight line extending through the transverse center of the preferably cylindrical container 60, from the forward end to the rearward end thereof. As the container 60 is preferably of a cylindrical shape, the said imaginary line extends through the axis of the container 60.

The container 60 has its annular side wall portion 62 provided with a rearward end portion 70 which extends inwardly and forwardly, the terminal end portion of the side wall portion 62 being of annular shape for a purpose later described.

The container 60 further has a rearward cap portion 76 disposed forwardly of the inwardly turned rearward end portion 70 and extending across and closing the rearward end of the container. The rearward cap portion 76 has an annular cap flange 78 which is attached to the periphery of the cap portion 76 and is disposed at a right angle to a transversely extending center portion 77 of the cap portion 76.

The container 60 has a rearward cap portion 76 provided with a center and transverse portion 77 extending transversely to the inner wall of the side wall portions 62 of the container 60.

The rearward cap portion 76 further includes an annular cap flange section disposed at the periphery of the center section 77, which latter is preferably of circular shape, and the flange 78 is disposed transversely to the center sections 77 and is disposed slidably and snugly against the inner wall of the side wall portion 62.

The flange 78 is complementarily shaped with respect to said inner wall of the side wall section 62, whereby the rearward cap portion 76 can function as a grease follower with its cap flange 78 closely following the inner wall of the side wall portion 62, sweeping the grease therefrom as later described.

The forward cap portion 66 is of such a size that its rearwardly extending flange 68 snugly fits the recess side wall 44.

The grease gun further has an elongated grease container receiving portion 90, which latter has a hollow interior of a size for snugly receiving the disposable grease container 60 and which is adapted to be disposed about the disposable container 60 as shown in Figure 1.

The receiving member 90 is preferably of cylindrical shape and more broadly speaking is of a sleeve shape complementary to the shape of the outer side walls 62 of the container 60. The receiving member 90 is preferably formed of a stiff material for protecting the container 60 from damage whereby the container 60 can be formed of cardboard or other rather inexpensive or weak material.

The disposable container receiving member 90 preferably is cylindrical and preferably has threads on the outer side thereof at its forward end for the threaded reception in the threads 46 of the pumping section 12.

Figure 2:
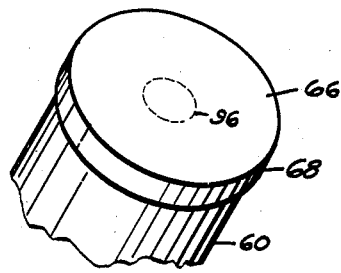
Figure 2 is a perspective view of the upper end of the grease container of this invention. Dotted lines thereon indicating the manner in which the forward end cap of the disposable grease container is to be cut for opening the container.
Figure 3:
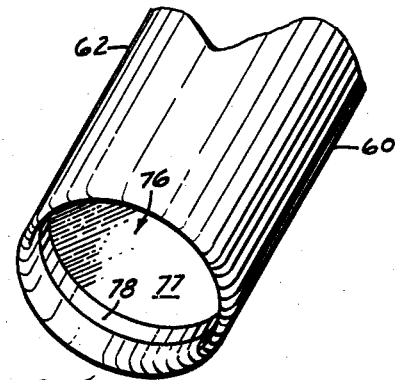
Figure 3 is a perspective view showing the rearward end of the grease container with the rearward end cap in a position in which it appears when the container is full of grease.

As thus described, it will be seen that in operation grease is delivered in the container 60 and the operator cuts a hole in the forward end cap member 66 and preferably along the dotted lines shown at 96 in Figure 2 and at the center of the cap member 66 whereby the opening formed at 96 is disposed opposite and in registry with the inlet aperture 48 of the pump 10 by inserting the forward end of the grease container 60 into the recess 42 of the pump at a time when the receiving member 90 is removed.

The receiving member 90 can then be placed over the disposable container 60 and screwed in place as shown in Figure 1. In this position the inner and forward end of the receiving member 90 engages the rearward end of flange 68 of the cap member 66 and presses the cap member 66 against the forward recess wall 42 for firmly holding the disposable grease container in place upon the pump 10.

Following this, use of the grease gun can begin in which pumping with the handle 24 draws grease through the inlet aperture 48 of the pumping handle 12, sucking grease from the forward end of the disposable grease container 60. At the same time, atmospheric pressure presses against the outer side of the rearward cap member 76, forcing it forward because of the reduced pressure on the inner side of the rearward cap member 76.

As pumping continues the rearward cap member 76 moves forward to and past the dotted line position shown in Figure 1, and all grease is exhausted from the container 60 when the end cap member 76 reaches the forward cap member 40.

It will be seen that the grease container receiving portion 90, its thread and the threads on the pumping head section together form a means on the pump and engaging the disposable container at its cap 68 with sufficient pressure to substantially seal the space between the wall of the container opening 96 and the wall of the pumping head aperture 48 to prevent air from leaking into the pump from around the container 60 and through such spaces.

As thus described, it will be seen that this invention has provided a disposable grease container and a combination assembly of a disposable grease container and grease gun which fulfill the above-described objects of the invention.

From the foregoing description, it is thought obvious that a disposable grease container constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. In combination, a disposable grease container comprising an annular side wall portion for receiving grease and having forward and rearward ends, said side wall portion having open forward and rearward ends and having substantially all inner side surfaces parallel to an imaginary straight line extending through said container from the forward to the rearward end thereof, a forward cap portion closing the forward end of said container, said forward cap portion having a transverse section disposed transversely to said line and closing said forward end of said side wall portion and said forward cap portion having an attached annular flange disposed in a position extending rearwardly over the outer side of the forward end of said annular side wall portion, said cap flange being of a size and shape complemental to the shape of said annular side wall portion, means securing said cap flange to the outer side of said side wall, and said container side wall portion having an inwardly and forwardly extending attached annular end portion at its rearward end, and a rearward cap portion disposed forwardly of said inwardly turned rearward end portion and having a center section extending transversely across and closing the rearward end of said container, said rearward cap portion also having an annular cap flange which is connected to the periphery of the center portion of the rearward cap portion and is disposed transversely to the center cap portion and is also disposed slidably and snugly against, and which is also complementarily shaped with respect to, the inner wall of said side wall portion whereby said rearward cap member can function as a grease follower, and a lubricating pump having an elongated disposable grease container receiving portion, said receiving portion having a hollow interior of a size for snugly receiving said disposable container and said receiving portion being disposed about said disposable container side wall, and said receiving member having one end disposed against the rearward edge of said forward cap, said lubricating pump further having a pumping head section having a recess therein of a size and shape for snugly receiving the forward end of said cap, said recess having a side wall of cylindrical shape threaded on its rearward portion, and said container receiving portion also being of cylindrical shape and threaded on its exterior at its forward end and disposed in removable threaded engagement with said recess side wall with the forward end of said container receiving portion pressing against the rearward edge of said forward cap member, said pumping head section having an inlet aperture extending forwardly from said recess and said forward cap member having an opening therethrough in registry with the entrance to said pumping head aperture.

2. In combination, a disposable grease container comprising an annular side wall portion for receiving grease and having forward and rearward ends, said side wall portion having open forward and rearward ends and having substantially all inner side surfaces parallel to an imaginary straight line extending through said container from the forward to the rearward end thereof, a forward cap portion closing the forward end of said container, said forward cap portion having a transverse section disposed transversely to said line and closing said forward end of said side wall portion and said forward cap portion having an attached annular flange disposed in a position extending rearwardly over the outer side of the forward end of said annular side wall portion, said cap flange being of a size and shape complemental to the shape of said annular side wall portion, means securing said cap flange to the outer side of said side wall, and a rearward cap portion disposed forwardly of the rearward end of said container and disposed inside of said container and having a center section extending transversely across and closing the rearward end of said container, said rearward cap portion also having an annular cap flange which is connected to the periphery of the center portion of the rearward cap portion and is disposed transversely to the center cap portion and is also disposed slidably and snugly against, and which is also complementarily shaped with respect to, the inner wall of said side wall portion whereby said rearward cap member can function as a grease follower, means on the rearward end of said container for preventing said rearward cap portion from coming out of the rearward end of said container, and a lubricating pump having an elongated disposable grease container receiving portion, said receiving portion having a hollow interior of a size for snugly receiving said disposable container and said receiving portion being disposed about said disposable container side wall, and said container receiving portion of said pump having one end disposed against the rearward edge of the flange of said forward cap, said lubricating pump further having a pumping head section having a recess therein of a size and shape for snugly receiving the forward end of said cap, said recess having a side wall of cylindrical shape threaded on its rearward portion, said pumping head and said container receiving portion having inter-connectable and disconnectable means thereon for attaching said head and container receiving portion together with the forward end of said container receiving portion pressing against the rearward edge of said forward cap member, said pumping head section having an inlet aperture extending forwardly from said recess and said forward cap member having an opening therethrough in registry with the entrance of said pumping head aperture.

References Cited in the file of this patent

UNITED STATES PATENTS

| | | |
|---|---|---|
| 1,751,128 | Cocks | Mar. 18, 1930 |
| 1,776,095 | Albertine | Sept. 16, 1930 |
| 1,975,313 | Creveling | Oct. 2, 1934 |
| 1,987,002 | Dodge | Jan. 8, 1935 |
| 2,111,582 | Crewe | Mar. 22, 1938 |